3,387,922
METHOD AND APPARATUS FOR PRODUCING ALKALI METAL AND/OR ALKALI EARTH METAL PHOSPHATES
Klaus Beltz, Knapsack, near Cologne, Germany; Kurt Willi Harri Kribbe, deceased, late of Knapsack, near Cologne, Germany, by Gertrud Katharina Kribbe, née Hanhardt, heir, Knapsack, near Cologne, and Heinrich Kribbe and Edith Kribbe, née Kuhrt, heirs, Brakel, near Hoxter, Germany; Joseph Cremer, Hermulheim, near Cologne, and Heinz Harnisch, Lovenich, near Cologne, Germany, assignors to Knapsack Aktiengesellschaft, a corporation of Germany
Filed Jan. 28, 1964, Ser. No. 341,169
Claims priority, application Germany, Feb. 2, 1963, K 48,838
8 Claims. (Cl. 23—106)

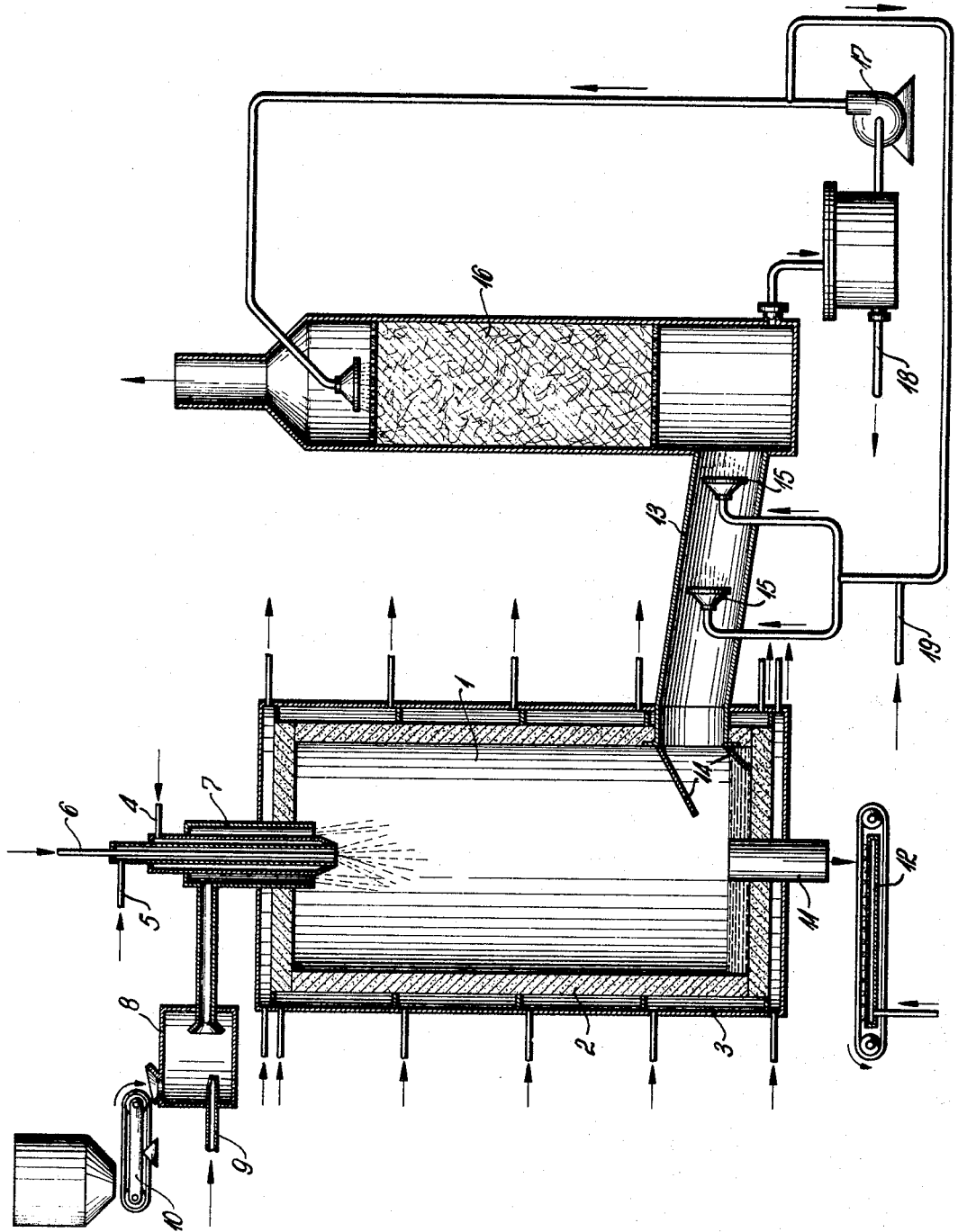

ABSTRACT OF THE DISCLOSURE

A method of producing a member selected from the group consisting of phosphates of alkali metals and alkaline earth metals comprising the steps of providing a reaction vessel having graphite walls, reacting within the vessel molten phosphorus and a gas containing molecular oxygen to thereby obtain phosphorus pentoxide containing hot gases, introducing salts of metals into the phosphorus pentoxide containing hot gases, withdrawing from the reaction vessel phosphates in the form of a melt, maintaining the temperature of the graphite walls of the reaction vessel at a temperature 20 to 50° C. above the temperature at which the phosphate melt begins to flow, and flowing a thinly liquid phosphate melt produced in the reaction vessel over the graphite walls before the reaction is started.

---

The present invention relates to a method and an apparatus for producing alkali metal and/or alkali-earth metal phosphates by introducing alkali metal- and/or alkali-earth metal compounds suspended in a carrier gas stream, for instance air, into hot gases containing $P_2O_5$ which are obtained by burning phosphorus with a gas containing free oxygen. By alkali metal and alkali-earth metal compounds, there are means for the purpose of this process primarily their oxides, hydroxides, carbonates, chlorides, nitrates and crude phosphates.

It is already known that phosphates can be prepared by reacting phosphorus in a graphite-lined rotary kiln in the presence of air and steam with metal salts which have a volatile anion. The rotary kiln is allowed to rotate with such a speed that due to the centrifugal forces produced, the graphite wall is covered on all sides with a thick layer of a molten mixture of phosphate and metal salt. In order to prevent the carbon reducing the resultant phosphate, the graphite lining is simultaneously cooled, for example by means of air, to temperatures of 1000° to 1100° C.

Substantial disadvantages of this process have prevented its gaining acceptance in actual practice up to now. In particular, when the system is under high loads, it is extremely difficult to dissipate the large quantity of heat liberated from the reaction chamber through the graphite wall which is only in part directly cooled. Furthermore, due to the irregular and difficultly adjustable cooling, it is not possible without great difficulties to maintain the molten layer necessary for the protection of the graphite lining at a given thickness of about 5 to 10 cm. without solidified crusts being formed.

The latter impair the heat transfer and change the composition of the final product, due to segregation effects at high temperatures. Furthermore, by the operation with a horizontal rotary kiln, the phosphate melt obtained is either contaminated by reaction with the cement which binds the graphite lining, or it is forced by the strong centrifugal forces acting on it through the joints of the lining and reacts with the outer iron shell which, in addition to contaminating the phosphate, leads after a relatively short period of time to a destruction of the iron shell. Furthermore, it is another great disadvantage of the known process that the degree of deposition of the reaction products in the reaction chamber is extremely poor, which leads to large losses in yield.

It has now surprisingly been found that these disadvantages can be overcome by reacting preferably molten phosphorus with a gas containing free oxygen and alkali metal and/or alkali-earth metal compounds by means of a multiple-material nozzle in a vertical stationary reaction chamber, the walls of which consist of graphite and are cooled by a gas, for example air. In this connection, it is important that at the beginning of the process, the graphite be impregnated with a phosphate melt and that the cooling of the graphite walls be so adjusted that their inner surfaces are maintained at temperatures above the melting points of the phosphates to be produced, and preferably 20 to 50° C. above the temperature at which the melt begins to flow. After reaction, the phosphates are then withdrawn in the form of a melt from the reaction chamber.

It is advantageous to allow the melt to collect as liquid phase in the lower end of the reaction chamber before it is withdrawn. The quantities withdrawn should be of such an amount that the remaining liquid phase contains the production quantity of a period of time of more than 10 minutes, and preferably more than thirty minutes as balance for any brief variations in the addition of phosphorus or alkali metal or alkali-earth metal so that a melt of constant composition discharges. In order to facilitate maintaining the molten phase liquid, it is advisable to discharge the waste gases from the reaction chamber in the vicinity of the liquid phase, and preferably directly over its surface. If the heat given off by the waste gases is not sufficient to maintain the melt phase liquid, additional heating sources can be provided for this purpose.

In order to maintain the entire surface of the graphite inner wall at a temperature which is as uniform as possible, it is advantageous to distribute the quantities of cooling gases fed from the outside to the graphite in accordance with the temperature gradient in the reaction chamber.

A better deposition of the reaction products can be obtained by atomizing the phosphorus with compressed air or some other compressed gas containing free oxygen through the multiple-material nozzle in such a manner that the resultant reaction products leave the nozzle with twist. The degree of deposition of the reaction products can be further increased by blowing the alkali metal and/or alkali-earth metal compounds suspended in a stream of carrier gas, for instance air, in such a manner into the multiple-material nozzle, preferably tangentially thereto, that the salt-gas mixture leaves the nozzle with twist. By this measure, the entire atmosphere within the reaction chamber is placed in rotation, and as a result of the effect of the centrifugal forces, a high degree of deposition of the reaction products is obtained.

By impregnating the graphite with a phosphate melt at the start of the reaction, it is possible considerably to improve its resistance to oxidation so that—in contradistinction to the known process—it is not necessary to have a protective layer of liquid phosphate melt of a thickness of several centimeters flow down the graphite inner wall. This impregnation is effected in the manner that at the start of the reaction, a thinly liquid phosphate melt, the alkali metal oxide:$P_2O_5$ ratio of which is less than 1.3 and preferably less than 1.1, is allowed to flow down over the inner surface of the graphite wall, the melt thereby penetrating into the pores of the graphite. During the impregnation, it is advisable to adjust the pressure in the cooling system of the graphite wall in such a manner that it is less than the pressure in the reaction chamber. On the other hand, the pressure should be greater in the cooling system than in the reaction chamber during the main reaction.

In order to carry out the method of the invention, there is used an apparatus which consists of a stationary and preferably cylindrical reaction chamber which carries at its upper end a phosphorus combustion nozzle in the form of a multiple-material nozzle and the walls of which, which are vertical or deviate only slightly from the vertical, consist of graphite joined together without seams and provided with boreholes or channels which serve to conduct cooling gases.

The graphite tower is optionally also surrounded with a jacket in such a manner that the jacket practically does not contact the outer wall of the graphite, and an inner space for improved guiding of the cooling gases is formed between the graphite and the jacket.

The correct dimensioning of the reaction chamber is also of great importance since firstly the temperature of the wall should not become too high, while secondly the temperature itself at the bottom of the reaction tower should still be sufficiently high so that the resultant melt can flow off in easily fluid form. For this reason, it has proven advantageous to select the dimensions of the tower in such a manner that the ratio of height to diameter is between about 2:1 and 5:1 and preferably about 3:1.

Furthermore, it is advisable to subdivide the cooling system into a plurality of cooling zones which are located horizontally one above the other and separated from each other, different large quantities of cooling gas being fed to them as a function of the temperature gradient in the reaction chamber. The graphite walls may consist of building elements such as blocks, plates or segments which are connected together in seamless fashion without the use of a binder or cement.

If phosphates having an alkali metal oxide/$P_2O_5$ ratio of $\leq 1.2$ are produced, it is advisable further to increase the degree of deposition by the provision of inserts in the bottom third of the reaction tower. These inserts, which may be pipes, bars, plates, blocks and the like, not only serve to increase the surface but effect a multiple deflection of the stream of gas and advantageously consist as the graphite walls themselves of electrolytic graphite which has been after-compressed by known methods.

Since a cooling of the inserts is in most cases not possible, their resistance to oxidation can be substantially increased by impregnating them in the same manner as the graphite walls at the start of the reaction. In the bottom of the reaction tower, there is arranged the outlet for the phosphate melt in the form of an overflow pipe, the height of which may optionally be designed variable so as to permit controlling the quantity of the molten liquid phase.

The advantages offered by the method of the present invention are, inter alia, that a stationary unit can be used as the reaction chamber, in which the measurement and control of the wall temperatures results in considerably less expense than in the case of a rotating unit. Furthermore, it is not necessary to maintain a molten layer of specific thickness on the walls, which would be possible only with great difficulty; still further, the degree of deposition is improved and the final product has a constant ratio of alkali metal or alkali-earth metal oxide to $P_2O_5$ which is not contaminated by reactions with the binders used for the lining or with the shell of the reaction chamber.

The accompanying drawing illustrates by way of example a nembodiment of the apparatus in accordance with the invention which, however, need not obligatorily be designed as shown in the drawing to be suitable for use in carrying out the process. Referring to the drawing: Reaction chamber or tower 1 is surrounded by graphite walls 2 which are provided with boreholes and channels which form a cooling system. To improve cooling gas conduct, the graphite walls may be surrounded bya jacket or shell 3 which does not contact the graphite walls and thus forms an intermediate space with them.

At the upper end of this reaction tower, there is located the phosphorus combustion nozzle 4 in which the liquid phosphorus fed through conduit 5 is atomized with compressed air. In the center of this nozzle, there is another air or oxygen feed 6 in order to obtain a dependable and complete combustion of the phosphorus up to the pentavalent stage. The nozzle is enveloped by a pipe 7 which is somewhat shorter than the nozzle. The alkali metal and/or alkali-earth compound suspended in a carrier gas is blown tangentially into said pipe. The salt-gas mixture is produced by an injector device 8. The latter consists of a top-open box, on one side wall of which there is located a pressure-gas nozzle 9 and at the other wall, about 80 mm. spaced therefrom, a feed pipe to the reaction tower with a funnel-like expanded opening. The salt coming from a metering device 10, for instance a belt scale, drops into the box and is carried along by the stream of gas into the reaction chamber. The phosphate melt produced leaves the tower via the discharge 11, developed as a dam, passes on to a cooling belt 12 or a cooling roller, and is quenched in known manner. The lower opening of the tower is so dimensioned as to avoid both the danger of clogging and the aspiration of too much leakage air, whereby the quantity of off-gas would be unnecessarily increased.

The dam, as well as the melt outlet are also made of graphite material which is impregnated with the melt and preferably after-compacted. An off-gas pipe 13 which leads to a scrubbing tower 16 is provided with baffle plates 14 and nozzles 15 which spray scrubbing liquid into the hot off-gases which have a temperature of about 500 to 900° C.

In this way, and by additional nozzles, the off-gas is cooled by evaporation of water from the scrubbing liquid to a temperature of 100° C. or less. The off-gas which has been cooled to this extent then passes into the scrubbing tower 16 of known type where the entrained product and the excess $P_2O_5$ are scrubbed out. The scrubbing liquid is recycled by a pump 17, whereby it becomes gradually concentrated. The concentrated, relatively acid phosphate solution is removed from the circuit at 18. The required fresh water is added at 19 to the solution shortly in front of the nozzles 15 so that there is always a more dilute solution at said point so that there is no danger of the solution crystallizing out in the nozzles and thus resulting in clogging. The discharging solution, after adjustment of the required alkali metal oxide/$P_2O_5$ ratio by means of caustic alkali or alkali carbonate can be processed directly by one of the known processes, for instance the spray process, into alkali metal pyrophosphate or tripolyphosphate.

If alkali metal or alkali-earth metal carbonates are used as starting materials in the method of the invention, a product of very high purity can be obtained from the scrubbing solution since the $CO_2$ liberated is not taken up by the relatively acid scrubbing solution. When alkali metal salts of other volatile acids are used, the acid liberated is absorbed even if to a small extent by the hot acid scrubbing solution so that products of lower purity are obtained therefrom, which, however, are suitable for a number of purposes.

When alkali metal salts of more scarcely volatile acids, such as for instance carbonic acid, are used it has proved very favorable for the course of the reaction concurrently to introduce a small amount of steam into the reaction tower, preferably in the vicinity of the phosphorus combustion nozzle or through the latter itself. In this way, purer products can be obtained at lower temperatures.

EXAMPLE 1

In an experimental plant having a reaction tower which consist of the said graphite material and has a height of 5 meters with an inside diameter of 2 meters, 170 kg. of phosphorus were reacted per hour with 258 kg. of 98% soda. As combustion air, 1.5 times the theoretically required amount was added. The soda was used in finely granular form, 70% having a particle size of less than 0.1 mm. It was blown into the tower, suspended in 80 cubic meters (S.T.P.) of air per hour. By adjustment of the cooling air, the temperature of the wall was maintained at 480° C. About 370 kg. per hour of a phosphate melt were obtained which were quenched on a cooling belt and thereupon broken up and ground. The phosphite content of the product was less than 0.01%. The yield of melt was 70%. In the scrubbing solution, a $Na_2O/P_2O_5$ ratio of 1.66 was established by the addition of 50% caustic soda solution and the solution containing 55% solids was converted by the method of German Patents 1,018,394 and 1,097,421 by injection into a flame zone, into sodium tripolyphosphate.

The total yield, referred to $P_2O_5$, was 98%.

EXAMPLE 2

In the same experimental set-up as in Example 1, 170 kg. per hour of phosphorus were burned with 1.5 times the amount of air theoretically required. 430 kg. per hour of 98% soda were blown into the flame, suspended in 80 cubic meters (S.T.P.) of air per hour. The wall temperature was maintained at 620° C. About 550 kg./hr., corresponding to 88% of the total quantity, were obtained as melt. The $CO_2$-content of the product was less than 0.1%. A 50% caustic soda solution was added to the scrubbing solution to obtain a solution with 50% solids and a $Na_2O/P_2O_5$ ratio of 2.0, which was worked into sodium pyrophosphate.

EXAMPLE 3

In the same experimental plant as in Examples 1 and 2, 170 kg./hr. of phosphorus were burned with 1.5 times the amount of air theoretically required. 340 kg./hr. of finely ground KCl, 90% of which had a particle size of less than 0.075 mm. were blown into the flame, suspended in 80 cubic meters (S.T.P.) of air per hour. Furthermore, 70 kg./hr. of steam were charged into the tower. For this experiment, the tower was provided with inserts consisting of graphite bars of a total surface of 25 m.² The wall temperature was maintained at 500° C. Each hour about 440 kg. of phosphate melt, corresponding to 75% of the total quantity, were obtained. The Cl-content was 0.2%. By addition of KOH, a $K_2O/P_2O_5$ ratio of 2.0 was established in the scrubbing solution, which had a chloride content of 1.5%. The solution was thereupon worked into $K_4P_2O_7$. The chloride content of the final product was 1%.

We claim:

1. In the production of alkali metal phosphates by nozzle spraying in a reaction zone an alkali metal compound into phosphorus pentoxide containing hot gases obtained by reacting molten phosphorus with a gas containing molecular oxygen and withdrawing the phosphates from the reaction zone in the form of a melt, the improvement according to which the reaction is carried out in a stationary reaction zone surrounded by gas cooled graphite walls, maintaining the temperature of the graphite walls 20 to 50° C. above the temperature at which the resulting phosphates begin to flow, and flowing a thinly liquid phosphate melt produced in the reaction zone over the graphite walls to impregnate the walls before the reaction is started.

2. The combination of claim 1 wherein the resulting phosphate melt is collected as a liquid phase in the lower portion of the reaction zone before it is withdrawn therefrom.

3. The combination of claim 2 including removing off-gas from the reaction zone immediately above the surface of the liquid phase.

4. The combination of claim 1 wherein the phosphate melt in the reaction zone is maintained in a molten condition by supplying additional heat.

5. A combination of claim 1 wherein the gas reacting with the molten phosphorus and the medium for nozzle spraying the alkali metal compound into the reaction zone is a compressed gas containing molecular oxygen, the gas being blown into the reaction zone through a nozzle passageway and entering that passageway tangentially thereto so that the compound-gas mixture enters the reaction zone with a twist.

6. The combination of claim 1 wherein the phosphate melt flowing over the inner side of the graphite walls has an alkali metal oxide to phosphorus pentoxide ratio less than 1.3.

7. The combination of claim 1 including providing a gas cooling system for controlling the temperature of the graphite walls, the system operating on a lower pressure than the pressure prevailing in the reaction zone before the reaction is started whereby liquid phosphate melt flowed over the graphite walls is caused to penetrate the graphite walls due to the pressure differential between the inner and outer surfaces of the walls.

8. The combination of claim 7 wherein the pressure in the cooling system is maintained at a higher level than the pressure in the reaction zone during the reaction.

References Cited

UNITED STATES PATENTS

| | | | |
|---|---|---|---|
| 2,142,943 | 1/1939 | Kerschbaum | 23—106 |
| 2,192,124 | 2/1940 | Brill et al. | 23—1 |
| 2,644,745 | 7/1953 | Hemminger | 48—203 |
| 3,081,150 | 3/1963 | Beltz et al. | 23—106 |
| 3,168,373 | 2/1965 | Hartlapp et al. | 23—106 |

MILTON WEISSMAN, *Primary Examiner.*

OSCAR R. VERTIZ, *Examiner.*

O. F. CRUTCHFIELD, *Assistant Examiner.*